(12) United States Patent
Kakishima et al.

(10) Patent No.: US 12,074,656 B2
(45) Date of Patent: Aug. 27, 2024

(54) TERMINAL AND MEASUREMENT METHOD

(71) Applicant: NTT DOCOMO, INC., Tokyo (JP)

(72) Inventors: Yuichi Kakishima, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/756,988

(22) PCT Filed: Dec. 13, 2019

(86) PCT No.: PCT/JP2019/049042
§ 371 (c)(1),
(2) Date: Jun. 7, 2022

(87) PCT Pub. No.: WO2021/117242
PCT Pub. Date: Jun. 17, 2021

(65) Prior Publication Data
US 2023/0361892 A1    Nov. 9, 2023

(51) Int. Cl.
*H04B 17/318*    (2015.01)
*H04L 5/00*    (2006.01)

(52) U.S. Cl.
CPC ......... *H04B 17/328* (2023.05); *H04L 5/0048* (2013.01)

(58) Field of Classification Search
CPC ............................ H04B 17/328; H04L 5/0048
See application file for complete search history.

(56) References Cited

U.S. PATENT DOCUMENTS

| | | | |
|---|---|---|---|
| 2016/0014662 A1* | 1/2016 | Yiu | H04J 3/26 455/436 |
| 2021/0144570 A1* | 5/2021 | Chae | H04L 5/0094 |
| 2022/0279405 A1* | 9/2022 | Haghani | H04W 36/0016 |

FOREIGN PATENT DOCUMENTS

| | | |
|---|---|---|
| JP | 2002-534023 A | 10/2002 |
| WO | 2018/084985 A1 | 5/2018 |

OTHER PUBLICATIONS

International Search Report issued in PCT/JP2019/049042, mailed on Jun. 30, 2020 (5 pages).
Written Opinion of the International Searching Authority issued in PCT/JP2019/049042, mailed on Jun. 30, 2020 (3 pages).
3GPP TS 38.300 V15.7.0; "3rd Generation Partnership Project; Technical Specification Group Radio Access Network; NR; NR and NG-RAN Overall Description; Stage 2 (Release 15)"; Sep. 2019 (99 pages).
3GPP TS 38.215 V15.5.0; "3rd Generation Partnership Project; Technical Specification Group Radio Access Network; NR; Physical layer measurements (Release 15)"; Jun. 2019 (16 pages).

* cited by examiner

Primary Examiner — David B Lugo
(74) Attorney, Agent, or Firm — Osha Bergman Watanabe & Burton LLP

(57) ABSTRACT

A terminal includes a receiving unit that receives a reference signal for acquiring a channel state and a control unit that performs measurement related to RSRP (Reference signal received power), based on a result of receiving the reference signal, and subcarrier spacing to be applied to the reference signal.

2 Claims, 7 Drawing Sheets

TERMINAL AND MEASUREMENT METHOD

TECHNICAL FIELD

The present invention relates to a terminal and a measurement method in a radio communication system.

BACKGROUND ART

In NR (New Radio) (also referred to as 5G) being the succeeding system of the LTE (Long Term Evolution), a technology of satisfying, as requirements, a large-capacity system, a high-speed data transmission rate, a low delay, a simultaneous connection of multiple terminals, low cost, power saving, and the like is examined (for example, Non-Patent Document 1).

In NR, a terminal measures propagation path quality for the purpose of: handover or cell reselection; radio link monitoring (RLM) of the own cell; beam management; and the like (for example, Non-Patent Document 2). Regarding the propagation path quality to be measured, for example, RSRP (Reference signal received power), RSRQ (Reference signal received quality), RSSI (Received signal strength indicator), and SINR (Signal to interference plus noise power ratio) are provided.

CITATION LIST

Non-Patent Document

Non-Patent Document 1: 3GPP TS 38.300 V15.7.0 (2019-09)

Non-Patent Document 2: 3GPP TS 38.215 V15.5.0 (2019-06)

SUMMARY OF THE INVENTION

Problem to be Solved by the Invention

In NR, subcarrier spacing (SCS) is variable in order to accommodate various scenarios or propagation environments. For subcarrier spacing, for example, 15, 30, 60, 120, or 240 kHz is supported. An Orthogonal Frequency Division Multiplexing (OFDM) symbol length changes so as to shorten in inverse proportion to the subcarrier spacing.

Meanwhile, as disclosed in Non-Patent Document 2, RSRP is defined by power (W: watt). Because the power is defined by the work amount per unit time, the power increases in proportion to the subcarrier spacing, in a case where the work amount is the same. Thus, in a case where subcarrier spacings are different even though reference signals have the same work amount, because the symbol lengths in the time domain are different, the values of RSRP are different. Thus, there is a possibility that the determination of the measurement result has a problem.

The invention has been made in view of the above points, and an object thereof is to perform measurement which is adaptive to subcarrier spacing in a radio communication system.

Means for Solving Problem

According to a technology of the disclosure, there is a terminal including a receiving unit that receives a reference signal for acquiring a channel state and a control unit that performs measurement related to RSRP (Reference signal received power), based on a result of receiving the reference signal, and subcarrier spacing to be applied to the reference signal.

Effect of the Invention

According to the technology of the disclosure, it is possible to perform measurement which is adaptive to subcarrier spacing in a radio communication system.

MODE(S) FOR CARRYING OUT THE INVENTION

Hereinafter, an embodiment of the invention will be described with reference to the drawings. Note that the embodiment described below is just an example, and the embodiment to which the invention is applied is not limited to the following embodiment.

The known technology is appropriately used in an operation of a radio communication system in the embodiment of the invention. At this time, the known technology is, for example, known LTE, but is not limited to the known LTE. In addition, unless otherwise specified, it is assumed that the term "LTE" used in this specification has a broad meaning including LTE-Advanced and the subsequent schemes (for example, NR) of LTE-Advanced.

In addition, in the embodiment of the invention, which will be described below, terms of an SS (Synchronization signal), a PSS (Primary SS), an SSS (Secondary SS), a PBCH (Physical broadcast channel), a PRACH (Physical random access channel), a PDCCH (Physical Downlink Control Channel), a PDSCH (Physical Downlink Shared Channel), a PUCCH (Physical Uplink Control Channel), a PUSCH (Physical Uplink Shared Channel), and the like, which are used in the known LTE, are used. This is for convenience of description, and signals, functions, and the like similar to the above description may be referred to by other names. In addition, the above-described terms in NR correspond to an NR-SS, an NR-PSS, an NR-SSS, an NR-PBCH, an NR-PRACH, and the like. However, it is not necessary to specify a signal used in NR as "NR-".

In addition, in the embodiment of the invention, a duplex scheme may be a TDD (Time Division Duplex) scheme or a FDD (Frequency Division Duplex), or may be a scheme (for example, Flexible Duplex) other than the TDD scheme and the FDD scheme.

In addition, in the embodiment of the invention, "configuring" of a radio parameter and the like may mean that a predetermined value is pre-configured or that a radio parameter that is indicated by a base station 10 or a terminal 20 is configured.

Figure 1:
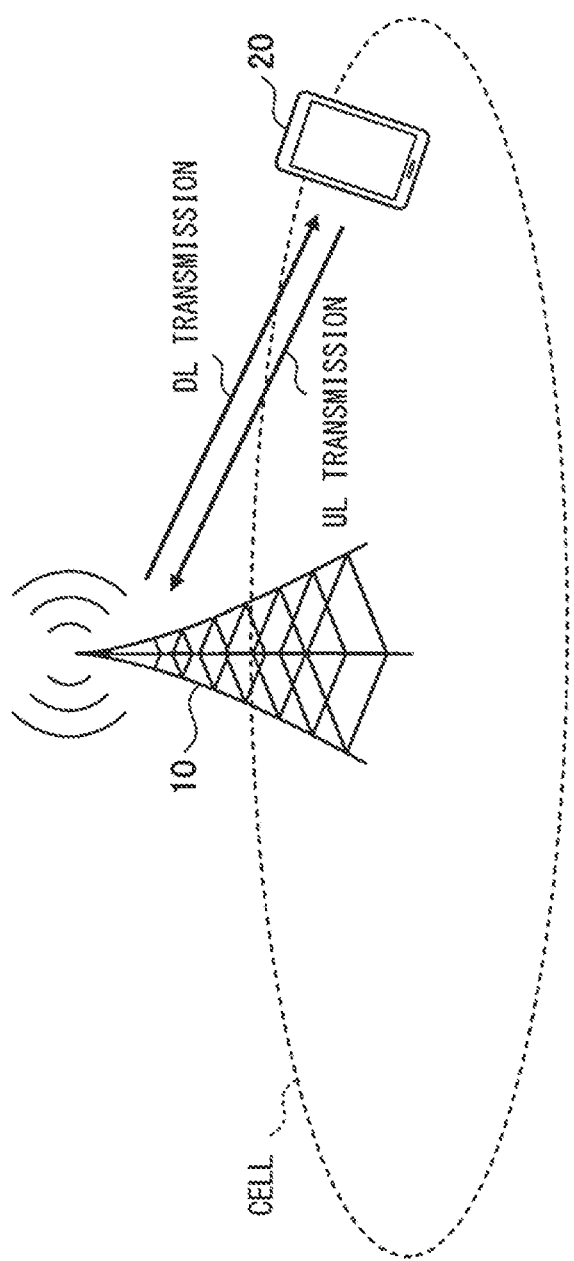
FIG. 1 is a diagram illustrating a configuration example of a radio communication system according to an embodiment of the invention.

FIG. 1 is a diagram illustrating a configuration example of a radio communication system in the embodiment of the invention. In the embodiment of the invention, the radio communication system includes a base station 10 and a terminal 20, as illustrated in FIG. 1. Although FIG. 1 illustrates one base station 10 and one terminal 20, FIG. 1 is just an example. A plurality of base stations and a plurality of terminals may be provided.

The base station 10 is a communication device that provides one or more cells and performs a radio communication with the terminal 20. The physical resource of a radio signal may be defined in a time domain and a frequency domain. The time domain may be defined by the number of OFDM (Orthogonal Frequency Division Multiplexing) symbols. The frequency domain may be defined by the number of subcarriers or the number of resource blocks. The base station 10 transmits a synchronization signal and system information to the terminal 20. The synchronization signal includes, for example, an NR-PSS and an NR-SSS. The system information is also referred to as broadcast information which is transmitted on an NR-PBCH, for example. The synchronization signal and the system information may be referred to as an SSB (SS/PBCH block). As illustrated in FIG. 1, the base station 10 transmits a control signal or data to the terminal 20 by a DL (Downlink) and receives a control signal or data from the terminal 20 by an UL (Uplink). Both the base station 10 and the terminal 20 may perform beam forming and perform transmission and reception of a signal. In addition, both the base station 10 and the terminal 20 may apply a communication by MIMO (Multiple Input Multiple Output) to the DL or the UL. In addition, both the base station 10 and the terminal 20 may perform a communication through a secondary cell (SCell) and a primary cell (PCell) by CA (Carrier Aggregation). Furthermore, the terminal 20 may perform a communication through a primary cell of the base station 10 and a primary secondary cell (PSCell) of another base station 10 by DC (Dual Connectivity).

The terminal 20 is a communication device including a radio communication function, such as a smart phone, a portable phone, a tablet, a wearable terminal, or a communication module for M2M (Machine-to-Machine). As illustrated in FIG. 1, the terminal 20 receives a control signal or data from the base station 10 by the DL and transmits a control signal or data to the base station 10 by the UL, and the terminal uses various communication services by the radio communication system in this manner. In addition, the terminal 20 receives various reference signals transmitted from the base station 10 and measures propagation path quality based on the result of receiving the reference signal.

In NR, the terminal measures propagation path quality for the purpose of handover, cell reselection, radio link monitoring (RLM) of the own cell, beam management, and the like. Regarding the propagation path quality to be measured, for example, RSRP (Reference signal received power), RSRQ (Reference signal received quality), RSSI (Received signal strength indicator), and SINR (Signal to interference plus noise power ratio) are provided.

For example, according to Non-Patent Document 2, CSI-RSRP by CSI-RS (Channel state information-reference signal) is defined as follows.

The CSI-RSRP is defined as a linear average of power (W: watt) of a resource element (RE) of an antenna port that operates CSI-RS configured for RSRP measurement in a frequency band as a measurement target including the configured CSI-RS occasion.

Here, in NR, subcarrier spacing (SCS) is variable in order to accommodate various scenarios or propagation environments. For subcarrier spacing, for example, 15, 30, 60, 120, or 240 kHz is supported. An Orthogonal Frequency Division Multiplexing (OFDM) symbol length changes so as to shorten in inverse proportion to the subcarrier spacing.

Meanwhile, as described above, RSRP is defined by the power. Because the power is defined by the work amount per unit time, the power increases in proportion to the subcarrier spacing, in a case where the work amount is the same. Thus, in a case where subcarrier spacings are different even though reference signals have the same work amount, because the symbol lengths in the time domain are different, the values of RSRP are different. Thus, there is a possibility that the determination of the measurement result has a problem.

For example, assuming RSRP based handover, the RSRP value is measured to be relatively small in a case where the subcarrier spacing is small. Thus, there is a possibility that handover occurs frequently. In addition, LTE has subcarrier spacing of 15 kHz. Thus, in a case where the RSRP value is compared with the RSRP value in NR in which subcarrier spacing of 15 kHz or greater is adopted, there is a possibility that it is not possible to properly compare the measurement result because of a difference in subcarrier spacings.

Figure 2:
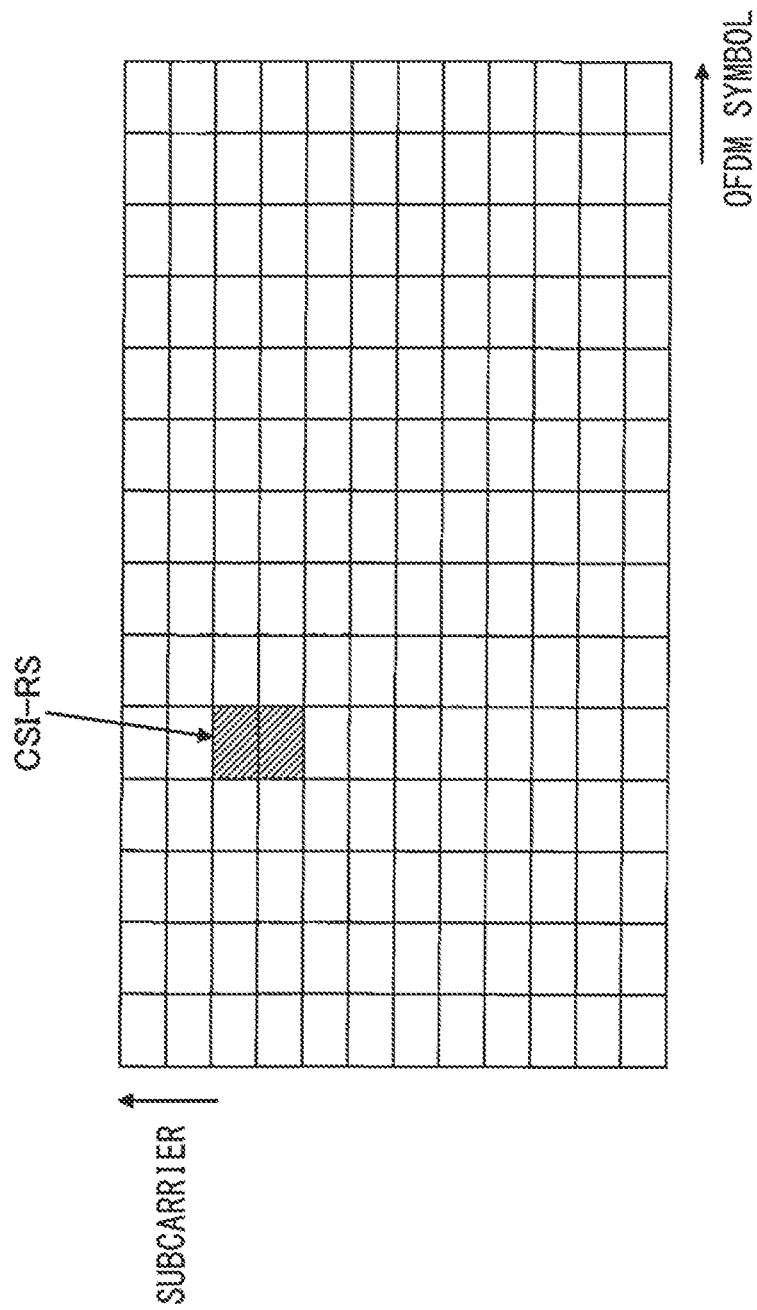
FIG. 2 is a diagram illustrating an example of one PRB (Physical resource block) in 15 kHz subcarrier spacing.
Figure 3:
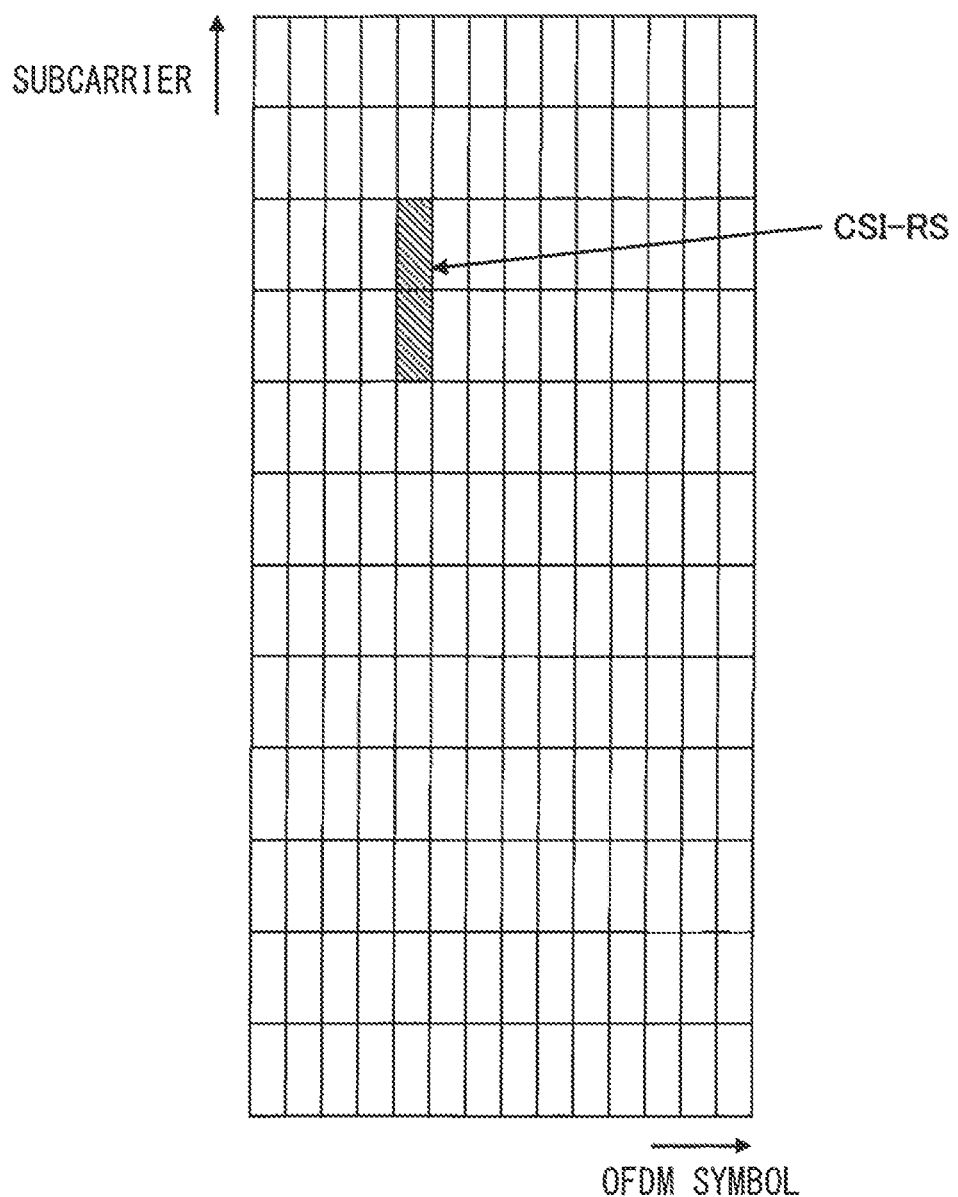
FIG. 3 is a diagram illustrating an example of one PRB (Physical resource block) in 30 kHz subcarrier spacing.

FIG. 2 is a diagram illustrating an example of one PRB (Physical resource block) in 15 kHz subcarrier spacing. FIG. 3 is a diagram illustrating an example of one PRB (Physical resource block) in 30 kHz subcarrier spacing.

As illustrated in FIGS. 2 and 3, the resource element of the 30 kHz subcarrier spacing has twice the size in a frequency direction and half the size in a time direction in comparison to the resource element of 15 kHz subcarrier spacing. Thus, in a case where CSI-RS having the same work amount (or power density per frequency) is transmitted, the power of CSI-RS in 30 kHz subcarrier spacing is twice the power of CSI-RS in 15 kHz subcarrier spacing. For example, conversely, in a case where a CSI-RS having the same power is transmitted, the work amount of the CSI-RS in the 30 kHz subcarrier spacing is half of the work amount of the CSI-RS in the 15 kHz subcarrier spacing.

Thus, the terminal 20 may perform measurement considering the subcarrier spacing. For example, the terminal may perform measurement assuming that the work amount per resource element is the same for some or all of a plurality of signals having subcarrier spacing different from each other. In addition, the terminal 20 may receive an indication of a group of reference signals assumed to be the same, from the base station 10. In addition, the terminal 20 may receive an indication of a difference in work amount between a plurality of reference signals, from the base station 10.

Figure 4:
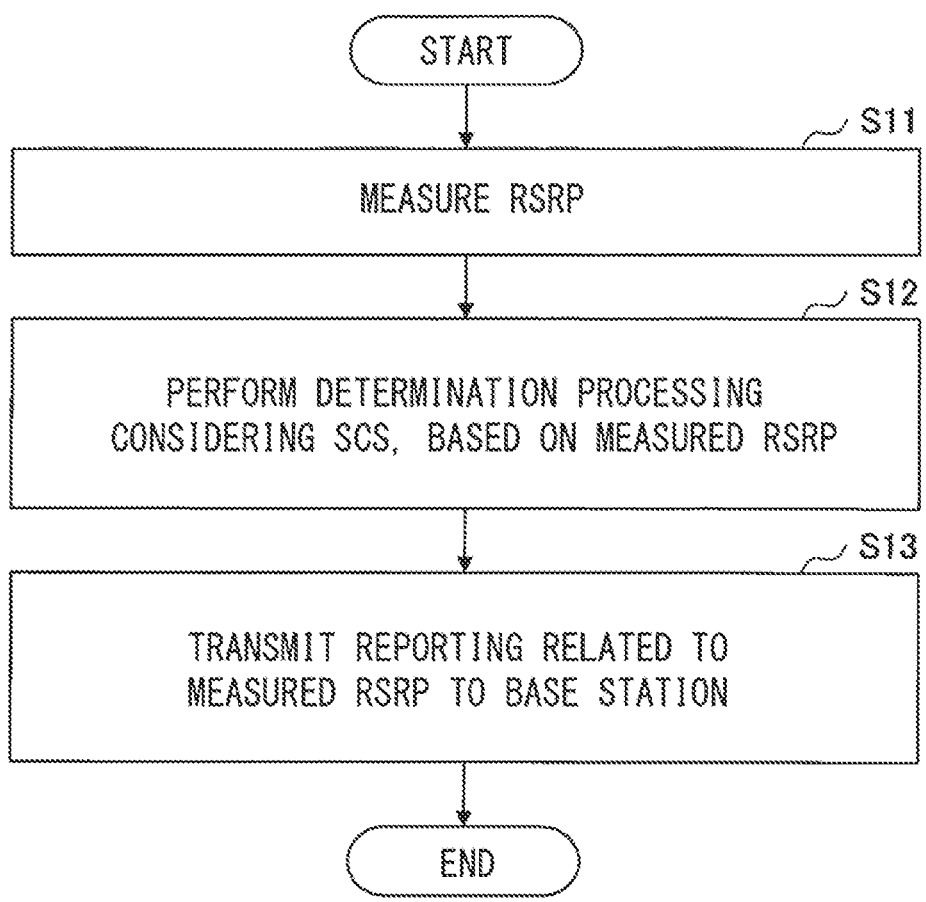
FIG. 4 is a flowchart for describing RSRP Measurement Example (1) in the embodiment of the invention.

FIG. 4 is a flowchart for describing RSRP Measurement Example (1) in the embodiment of the invention. In Step S11, the terminal 20 measures RSRP by the definition in the related art. Then, the terminal performs determination processing considering subcarrier spacing, based on the measured RSRP (S12). For example, in a case where the terminal compares the RSRP of a signal in 15 kHz subcarrier spacing with the RSRP of a signal in 30 kHz subcarrier spacing, in Step 312, the terminal 20 may perform the determination processing by multiplying the RSRP of the signal in 30 kHz subcarrier spacing by 0.5. In Step S13, the terminal 20 transmits reporting related to the measured RSRP, to the base station 10. Note that Step S12 or S13 may or may not be performed as necessary.

In addition, as another method, the terminal 20 may perform the measurement assuming that power of some or all of a plurality of signals having different subcarrier spacing is the same. Then, the terminal may receive an indication of a group of reference signals assumed to be the same, from the base station 10. In addition, the terminal 20 may receive an indication of a power difference between a plurality of reference signals, from the base station 10.

In addition, as another method, the RSRP may be defined considering subcarrier spacing. For example, the terminal 20 may multiply the measured power by a coefficient inversely proportional to the subcarrier spacing.

Figure 5:
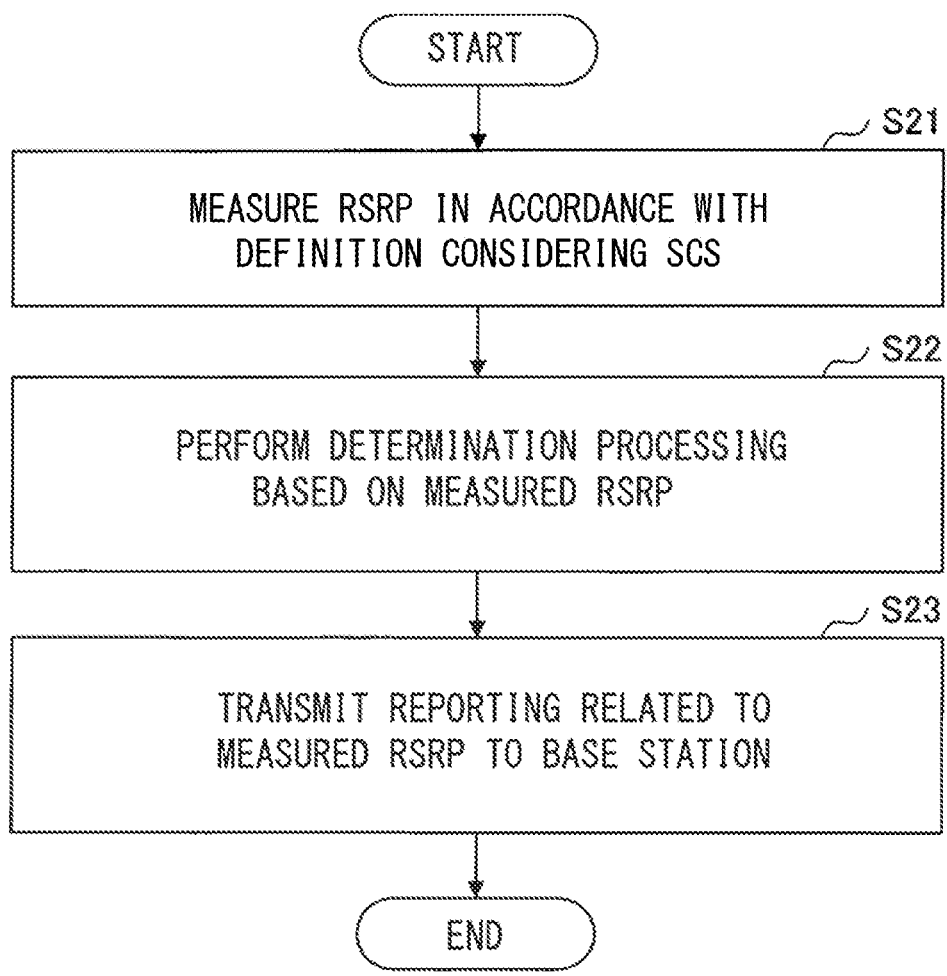
FIG. 5 is a flowchart for describing RSRP Measurement Example (2) in the embodiment of the invention.

FIG. 5 is a flowchart for describing RSRP Measurement Example (2) in the embodiment of the invention. In Step S21, the terminal measures the RSRP in accordance with the definition considering subcarrier spacing. For example, the terminal 20 may multiply the measured power by a coefficient based on subcarrier spacing of 15 kHz as a reference. For example, in the case of 30 kHz subcarrier spacing, the terminal may calculate the RSRP by multiplying the measured power by 0.5. In the case of 60 kHz subcarrier spacing, the terminal may calculate the RSRP by multiplying the measured power by 0.25. The example in which the subcarrier spacing of 15 kHz is used as the reference is described. However, another frequency bandwidth may be used as the reference, or the terminal 20 or the base station 10 may determine the subcarrier spacing used as the reference.

In Step S22, the terminal 20 performs determination processing based on the measured RSRP. Then, the terminal 20 transmits reporting related to the measured RSRP, to the base station 10 (S23). Further, in Step S23, the terminal 20 may transmit the subcarrier spacing used as the reference of RSRP calculation to the base station 10. Note that Step 322 or S23 may or may not be performed as necessary. In addition, the base station 10 may indicate, to the terminal 20, the subcarrier spacing used as the reference of RSRP calculation.

Note that, in another example, an RSRP defined by work amount, which differs from the RSRP defined by the above-described rate of work, may be used. For example, the RSRP may be defined as the work amount per one or more resource elements. In addition, for example, the RSRP may be defined as the work amount per resource element constituting the reference signal.

Note that, in another example, an RSRP which is defined by power density per predetermined frequency band, differing from the RSRP defined by the above-described power, may be used. For example, the RSRP may be defined by power per 1 Hz. The RSRP may be defined by power per 15 kHz. A unit bandwidth as a target for calculating the RSRP may be defined in advance in the specification. The base station 10 may determine the unit bandwidth and indicate it to the terminal 20. The terminal 20 may determine the unit bandwidth and indicate it to the base station 10.

Note that, in another example, the known method of calculating the RSRP may be performed. For example, in a case of assuming the same power density, a specification may be clarified such that the measured RSRP value increases in accordance with subcarrier spacing.

Note that, in another example, correction to be inversely proportional to the subcarrier spacing as in 1) to 3) may be performed on the RSRP.

1) The terminal 20 may report the resultant obtained by performing correction by subcarrier spacing on the measured RSRP value, to the base station 10. For example, the terminal may report half of the measured RSRP value in 30 kHz subcarrier spacing, to the base station 10.

2) As shown in Tables 1 and 2, the terminal may define the reported value by adding an offset, which is different for each subcarrier spacing, to the measured RSRP value. That is, the same reported value may correspond to RSRP values different in accordance with subcarrier spacing.

TABLE 1

| Reported value | L1-RSRP (15 kHz) | L1-RSRP (30 kHz) | ... | L1-RSRP (240 kHz) | Unit |
|---|---|---|---|---|---|
| RSRP_0 | Not valid | Not valid | | Not valid | dBm |
| RSRP_1 | Not valid | Not valid | | Not valid | dBm |
| RSRP_2 | Not valid | Not valid | | Not valid | dBm |
| RSRP_3 | Not valid | Not valid | | Not valid | dBm |
| RSRP_4 | Not valid | Not valid | | Not valid | dBm |
| RSRP_5 | Not valid | Not valid | | Not valid | dBin |
| RSRP_6 | Not valid | Not valid | | Not valid | dBm |
| RSRP_7 | Not valid | Not valid | | Not valid | dBm |
| RSRP_8 | Not valid | Not valid | | Not valid | dBm |
| RSRP_9 | Not valid | Not valid | | Not valid | dBm |
| RSRP_10 | Not valid | Not valid | | Not valid | dBm |
| RSRP_11 | Not valid | Not valid | | Not valid | dBm |
| RSRP_12 | Not valid | Not valid | | Not valid | dBm |
| RSRP_13 | Not valid | Not valid | | Not valid | dBm |
| RSRP_14 | Not valid | Not valid | | Not valid | dBm |
| RSRP_15 | Not valid | Not valid | | Not valid | dBm |
| RSRP_16 | RSRP < −140 | RSRP < −137 | | RSRP < −128 | dBm |
| RSRP_17 | −140 ≤ RSRP < −139 | −137 ≤ RSRP < −136 | | −128 ≤ RSRP < −127 | dBm |
| RSRP_18 | −139 ≤ RSRP < −138 | −136 ≤ RSRP < −135 | | −127 ≤ RSRP < −126 | dBm |
| ... | | | | | |

TABLE 2

| Reported value | L1-RSRP (15 kHz) | L1-RSRP (30 kHz) | ... | L1-RSRP (240 kHz) | Unit |
|---|---|---|---|---|---|
| ... | | | | | |
| RSRP_111 | −46 ≤ RSRP < −45 | −43 ≤ RSRP < −42 | | −34 ≤ RSRP < −33 | dBm |
| RSRP_112 | −45 ≤ RSRP < −44 | −42 ≤ RSRP < −41 | | −33 ≤ RSRP < −32 | dBm |
| RSRP_113 | −44 ≤ RSRP | −41 ≤ RSRP | | −32 ≤ RSRP | dBm |
| RSRP_114 | Not valid | Not valid | | Not valid | dBm |
| RSRP_115 | Not valid | Not valid | | Not valid | dBm |
| RSRP_116 | Not valid | Not valid | | Not valid | dBm |
| RSRP_117 | Not valid | Not valid | | Not valid | dBm |
| RSRP_118 | Not valid | Not valid | | Not valid | dBm |
| RSRP_119 | Not valid | Not valid | | Not valid | dBm |
| RSRP_120 | Not valid | Not valid | | Not valid | dBm |
| RSRP_121 | Not valid | Not valid | | Not valid | dBm |
| RSRP_122 | Not valid | Not valid | | Not valid | dBm |
| RSRP_123 | Not valid | Not valid | | Not valid | dBm |
| RSRP_124 | Not valid | Not valid | | Not valid | dBm |
| RSRP_125 | Not valid | Not valid | | Not valid | dBm |
| RSRP_126 | Not valid | Not valid | | Not valid | dBm |
| RSRP_127 (Note) | Infinity | Infinity | | Infinity | dBm |

Note: The value of RSRP_127 is applicable for RSRP threshold configured by the network as defined in TS 38.331 [2], but not for the purpose of measurement reporting.

As shown in Tables 1 and 2, a reported value in 30 kHz subcarrier spacing, which is the same reported value corresponding to an RSRP in 15 kHz subcarrier spacing, may be defined to correspond to an RSRP larger than the RSRP in the 15 kHz subcarrier spacing by 3 dB. In addition, for example, a reported value in 240 kHz subcarrier spacing, which is the same reported value corresponding to an RSRP in 15 kHz subcarrier spacing, may be defined to correspond to an RSRP larger than the RSRP in the 15 kHz subcarrier spacing by 12 dB. Similarly, in 60 kHz subcarrier spacing, an RSRP larger than an RSRP in 15 kHz subcarrier spacing by 6 dB may be defined to correspond to the same reported value. In 120 kHz subcarrier spacing, an RSRP larger than an RSRP in 15 kHz subcarrier spacing by 9 dB may be defined to correspond to the same reported value.

3) Correction by subcarrier spacing may be applied to a threshold used for associated measurement. For example, correction by subcarrier spacing may be applied to a threshold for determining handover. For example, determination may be performed based on the RSRP in the 15 kHz subcarrier spacing as a reference, by multiplying the threshold in the case of the RSRP in the 30 kHz subcarrier spacing by a coefficient of 0.5. Determination may be performed by multiplying the threshold in the case of the RSRP in the 60 kHz subcarrier spacing by a coefficient of 0.25. Determination may be performed by multiplying the threshold in the case of the RSRP in 120 kHz subcarrier spacing by a coefficient of 0.125. Determination may be performed by multiplying the threshold in the case of the RSRP in 240 kHz subcarrier spacing by a coefficient 0.0625.

In the above-described example, the method being applied to CSI-RSRP is described. The same method may also be applied to SS-RSRP. Similar to CSI-RSRP, regarding SS-RSRP, when the subcarrier spacing increases, the RSRP value is measured to increase, in the case of the same work amount. Similarly, the method may be applied to another signal such as an SRS.

In the above-described example, the method being applied to the RSRP is described. The same method may also be applied to a measurement index other than the RSRP. For example, the same method may be applied to RSRQ, RSSI, and SINR.

The method described in the above-described example may also be applied to cases other than Layer 1 measurement. For example, the method may be applied to Layer 3 measurement.

Note that the method which is related to the RSRP and described may be applied to an EPRE (Energy per resource element) of the terminal 20. For example, the EPRE may be defined as the work amount or defined as the power. For example, the EPRE may be defined as the work amount per resource element or may be defined as power per subcarrier. Regarding the EPRE, correction considering the subcarrier spacing may be applied. For example, the EPRE may be multiplied by the coefficient which is inversely proportional to the subcarrier spacing.

Note that, in the above-described example, the subcarrier spacing may be replaced with a time length of an OFDM symbol length or the like. The subcarrier spacing and the OFDM symbol length have a simple relation of being inversely proportional.

The embodiment of the invention may be applied regardless of distinguishment between an uplink, a downlink or between transmission and reception. An uplink signal and an uplink channel may be replaced with a downlink signal and a downlink channel. Uplink feedback information may be replaced with downlink control signaling.

In the above-described example, an indication of signaling from the base station 10 to the terminal 20 or signaling from the terminal 20 to the base station 10 may be performed by an implicit method in addition to an explicit method. In addition, unique definition in the specification may be performed without signaling.

In the above-described example, signaling from the base station 10 to the terminal 20 or signaling from the terminal 20 to the base station 10 may be signaling in a different layer, such as RRC signaling, signaling by the MAC-CE, or signaling by the DCI, or may be signaling by broadcast information (MIB (Master Information Block), SIB (System Information Block)). In addition, for example, RRC signaling and signaling by the DCI may be combined. RRC signaling and signaling by the MAC-CE may be combined. RRC signaling, signaling by the MAC-CE, and signaling by the DCI may be combined.

In the above-described example, the technology for RSRP measurement and reporting is disclosed. The measurement and reporting to which this technology can be applied are not limited to RSRP. For example, this technology may be applied to CSI measurement, channel sounding, beam management, a link recovery procedure, radio link monitoring, and Layer 3 measurement.

In the above-described example, the resource block may be replaced with the subcarrier. Similarly, in the above-described example, the slot may be replaced with the symbol.

In the above-described example, the cell, the base station, or a TRP (Transmission reception point) may be replaced with each other.

The above-described examples may be combined with each other. The features disclosed in the above-described examples may be combined in various manners. The combination is not limited to the specific combination to be disclosed.

With the above-described example, the terminal 20 can measure the RSRP considering subcarrier spacing. In addition, the terminal may change the definition of the RSRP in accordance with the subcarrier spacing. In addition, the terminal may correct the RSRP or the associated threshold in accordance with the subcarrier spacing.

That is, in the radio communication system, it is possible to perform measurement adaptive to subcarrier spacing.

(Device Configuration)

Next, a functional configuration example of the base station 10 and the terminal 20 that perform the processing and the operations described above will be described. The base station 10 and the terminal 20 include functions of implementing the above-described example. However, each of the base station 10 and the terminal 20 may include only some of the functions in the example.

<Base Station 10>

Figure 6:
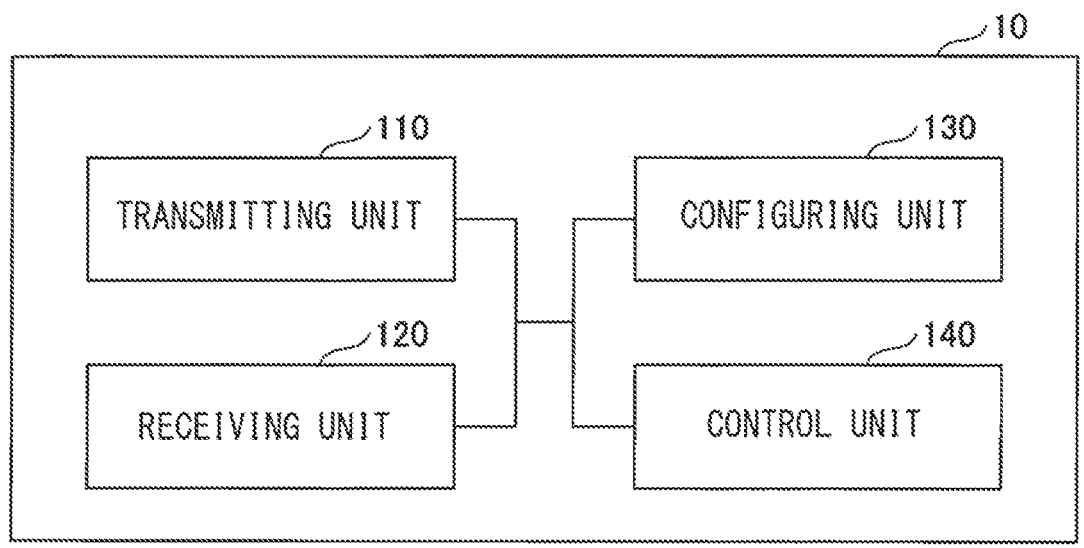
FIG. 6 is a diagram illustrating an example of a functional configuration of a base station 10 in the embodiment of the invention.

FIG. 6 is a diagram illustrating an example of a functional configuration of the base station 10 in the embodiment of the invention. As illustrated in FIG. 6, the base station 10 includes a transmitting unit 110, a receiving unit 120, a configuring unit 130, and a control unit 140. The functional configuration illustrated in FIG. 6 is just an example. So long as the operation according to the embodiment of the invention can be performed, the function categories and the names of the function units may be freely set.

The transmitting unit 110 includes functions of generating a signal to be transmitted to the terminal 20 side and transmitting the generated signal by radio. In addition, the transmitting unit 110 transmits a message between network nodes to another network node. The receiving unit 120 includes functions of receiving various signals transmitted from the terminal 20 and acquiring information of, for example, a higher layer from the received signal. In addition, the transmitting unit 110 includes a function of transmitting an NR-PSS, an NR-SSS, an NR-PBCH, a DL/UL control signal, and the like to the terminal 20. In addition, the receiving unit 120 receives a message between network nodes from another network node.

The configuring unit 130 stores pre-configured configuration information and various types of configuration information to be transmitted to the terminal 20. Regarding the content of the configuration information, for example, information related to RSRP measurement of the terminal 20 is provided.

As described in the example, the control unit 140 performs a control related to the RSRP measurement of the terminal 20. The transmitting unit 110 may include the functional unit in the control unit 140, which relates to signal transmission, and the receiving unit 120 may include the functional unit in the control unit 140, which relates to signal reception.

<Terminal 20>

Figure 7:
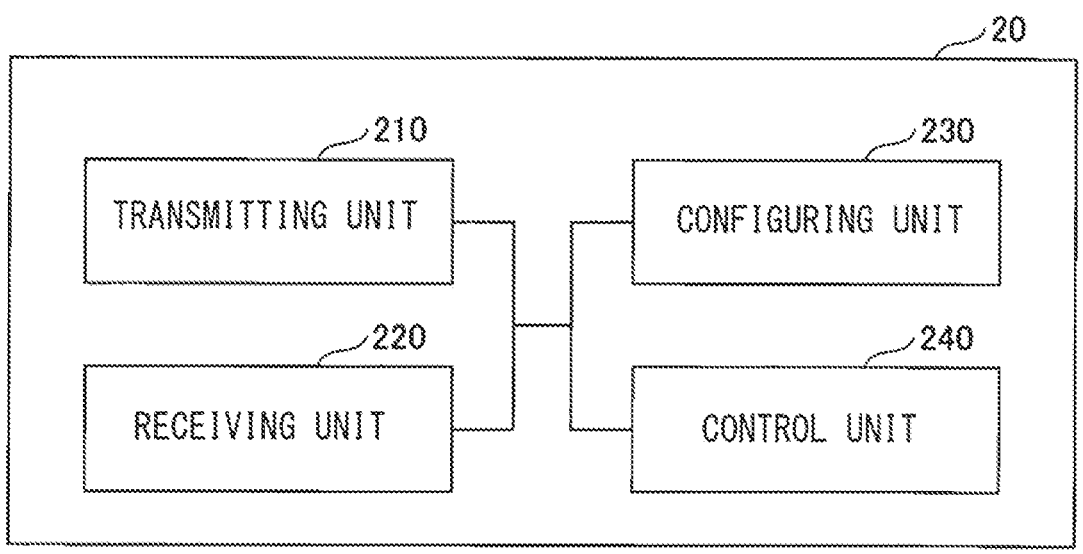
FIG. 7 is a diagram illustrating an example of a functional configuration of a terminal 20 in the embodiment of the invention.

FIG. 7 is a diagram illustrating an example of a functional configuration of the terminal 20 in the embodiment of the invention. As illustrated in FIG. 7, the terminal 20 includes a transmitting unit 210, a receiving unit 220, a configuring unit 230, and a control unit 240. The functional configuration illustrated in FIG. 7 is just an example. So long as the operation according to the embodiment of the invention can be performed, the function categories and the names of the function units may be freely set.

The transmitting unit 210 creates a transmission signal from transmission data and transmits the transmission signal by radio. The receiving unit 220 receives various signals by radio and acquires a signal of a higher layer from the received signal of a physical layer. In addition, the receiving unit 220 includes a function of receiving an NR-PSS, an NR-SSS, an NR-PBCH, a DL/UL/SL control signal, and the like, which are transmitted from the base station 10. In addition, for example, the transmitting unit 210 transmits a PSCCH (Physical Sidelink Control Channel), a PSSCH (Physical Sidelink Shared Channel), a PSDCH (Physical Sidelink Discovery Channel), a PSBCH (Physical Sidelink Broadcast Channel), and the like to another terminal 20 by D2D communication. The receiving unit 220 receives a PSCCH, a PSSCH, a PSDCH, a PSBCH, or the like from another terminal 20.

The configuring unit 230 stores various types of configuration information received from the base station 10 by the receiving unit 220. In addition, the configuring unit 230 also stores pre-configured configuration information. Regarding the content of the configuration information, for example, information related to RSRP measurement is provided.

As described in the example, the control unit 240 performs a control related to the RSRP measurement. The transmitting unit 210 may include the functional unit in the control unit 240, which relates to signal transmission, and the receiving unit 220 may include the functional unit in the control unit 240, which relates to signal reception.

(Hardware Configuration)

The block diagrams (FIGS. 6 and 7) used in the description of the above embodiment illustrate functional unit blocks. The functional blocks (components) are implemented by at least any one combination of hardware and software. In addition, an implementation method of the functional blocks is not particularly limited. That is, each functional block may be implemented by using one device that is physically or logically coupled or may be realized by using a plurality of devices obtained by directly or indirectly (for example, using a wired or wireless manner) connecting two or more devices that are physically or logically separated from each other, with each other. The functional block may be implemented by combining the one device or the plurality of devices with software.

The function includes determining, judging, computing, calculating, processing, deriving, examining, searching, checking, receiving, transmitting, outputting, accessing, solving, selecting, establishing, comparing, assuming, expecting, observing, broadcasting, notifying, communicating, forwarding, configuring, reconfiguring, allocation, mapping, assigning, and the like. The function is not limited to the above description. For example, the functional block (component) for causing transmission is referred to as the transmitting unit or a transmitter. In any case, as described above, the implementation method is not particularly limited.

Figure 8:
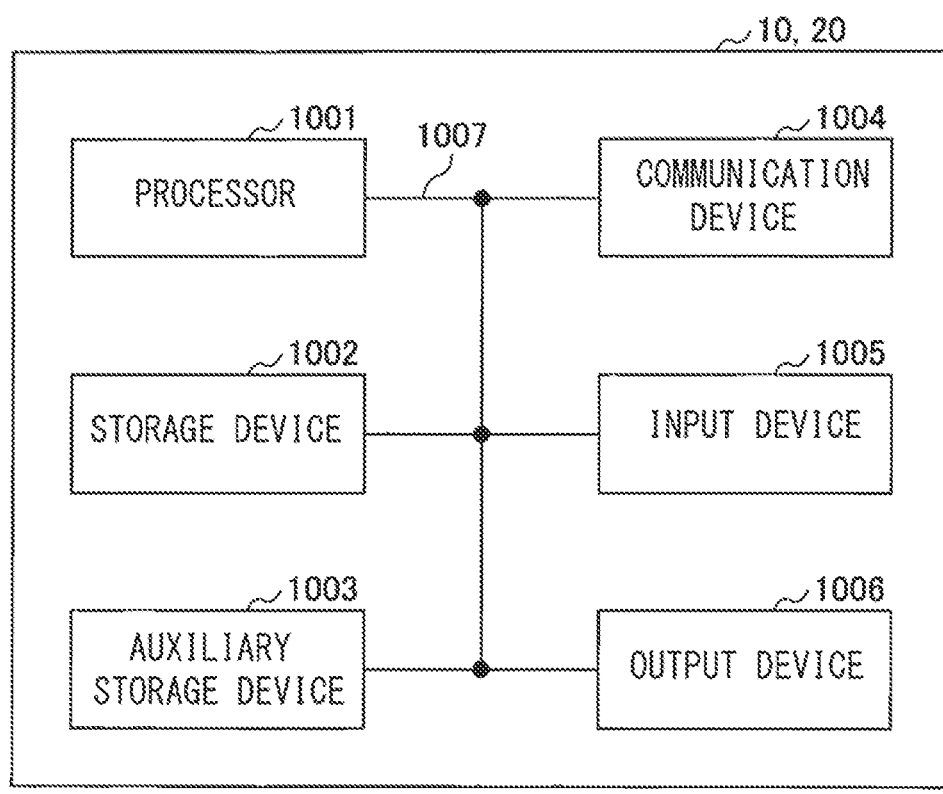
FIG. 8 is a diagram illustrating an example of a hardware configuration of the base station 10 or the terminal 20 in the embodiment of the invention.

For example, the base station 10, the terminal 20, and the like in one embodiment of the present disclosure may function as a computer that perform the processing of the radio communication method in the present disclosure. FIG. 8 is a diagram illustrating an example of a hardware configuration of the base station 10 and the terminal 20 in the embodiment of the invention. Each of the base station 10 and the terminal 20 described above may be physically configured as a computer device that includes a processor 1001, a storage device 1002, an auxiliary storage device 1003, a communication device 1004, an input device 1005, an output device 1006, a bus 1007, and the like.

In the following description, the word "device" may be replaced with a circuit, a device, a unit, and the like. The hardware configuration of the base station 10 and the terminal 20 may be configured such that each of the devices illustrated in FIG. 11 may be provided to be one or plural. The hardware configuration may be made without including some devices.

The functions in the base station 10 and the terminal 20 are implemented in a manner that predetermined software (program) is read on hardware such as the processor 1001 and the storage device 1002, and thus the processor 1001 performs an arithmetic operation to control a communication by the communication device 1004 or to control at least one of data reading and data writing in the storage device 1002 and the auxiliary storage device 1003.

The processor 1001 operates, for example, an operating system to control the entirety of the computer. The processor 1001 may be configured by a central processing unit (CPU) including an interface with peripheral equipment, a control device, an arithmetic operation device, a register, and the like. For example, the control unit 140, the control unit 240, and the like described above may be implemented by the processor 1001.

In addition, the processor 1001 reads a program (program codes), a software module, data, and the like from at least one of the auxiliary storage device 1003 and the communication device 1004 into the storage device 1002 and performs various types of processing in accordance with the read program, software module, data, and the like. As such a program, a program causing a computer to perform at least some of the operations described in the above embodiment is used. For example, the control unit 140 in the base station 10 illustrated in FIG. 6 may be implemented by a control program that is stored in the storage device 1002 and operates on the processor 1001. In addition, for example, the control unit 240 in the terminal 20 illustrated in FIG. 7 may be implemented by a control program that is stored in the storage device 1002 and operates on the processor 1001. The description that the above-described various types of processing are performed by one processor 1001 is made. However, the various types of processing may be simultaneously or sequentially performed by two or more processors 1001. The processor 1001 may be mounted by one or more chips. Note that the program may be transmitted from a network via an electrical communication line.

The storage device 1002 is a computer readable recording medium. For example, the storage device 1002 may be configured by at least one of a ROM (Read Only Memory), an EPROM (Erasable Programmable ROM), an EEPROM (Electrically Erasable Programmable ROM), a RAM (Random Access Memory), and the like. The storage device 1002 may be referred to as a register, a cache, a main memory (main storage device), and the like. The storage device 1002 may store a program (program codes), a software module, and the like that are allowed to be executed to perform a radio communication method according to one embodiment of the present disclosure.

The auxiliary storage device 1003 is a computer readable recording medium. For example, the auxiliary storage device 1003 may be configured by at least one of an optical disk such as a CD-ROM (Compact Disc ROM), a hard disk drive, a flexible disk, a magneto-optical disk (for example, compact disk, digital versatile disk, and Blu-ray (registered trademark) disk), a smart card, a flash memory (for example, card, stick, and key drive), a Floppy (registered trademark) disk, a magnetic strip, and the like. The above-described storage medium may be, for example, a database including at least one of the storage device 1002 and the auxiliary storage device 1003, a server, and other appropriate media.

The communication device 1004 is hardware (transmission and reception device) for performing a communication between computers via at least one of a wired network and a wireless network. For example, the communication device 1004 is also referred to as a network device, a network controller, a network card, a communication module, or the like. For example, the communication device 1004 may be configured to include a high frequency switch, a duplexer, a filter, a frequency synthesizer, and the like in order to realize at least one of Frequency Division Duplex (FDD) and Time division Duplex (TDD). For example, a transmission and reception antenna, an amplifying unit, a transmitting and receiving unit, a transmission path interface, and the like may be implemented by the communication device 1004. The transmitting and receiving unit may be made in a manner that the transmitting unit and the receiving unit are physically or logically separated and mounted.

The input device 1005 is an input device (for example, keyboard, mouse, microphone, switch, button, sensor, and the like) that receives an input from the outside. The output device 1006 is an output device (for example, display, speaker, LED lamp, and the like) that performs an output to the outside. Note that the input device 1005 and the output device 1006 have an integrated configuration (for example, touch panel).

The devices such as the processor 1001 and the storage device 1002 are connected to each other by the bus 1007 for performing a communication of information. The bus 1007 may be configured using a single bus or configured using different buses for the devices.

In addition, each of the base station 10 and the terminal 20 may be configured to include hardware such as a microprocessor, a digital signal processor (DSP), an ASIC (Application Specific Integrated Circuit), a PLD (Programmable Logic Device), and an FPGA (Field Programmable Gate Array). With the hardware, some or all of the functional blocks may be implemented. For example, the processor 1001 may be mounted using at least one piece of the hardware.

(Summary of Embodiment)

As described above, according to the embodiment of the invention, there is provided the terminal including a receiving unit that receives a reference signal for acquiring a channel state and a control unit that performs measurement related to RSRP (Reference signal received power), based on a result of receiving the reference signal, and subcarrier spacing to be applied to the reference signal.

With the above configuration, the terminal 20 can measure the RSRP considering subcarrier spacing. In addition, the terminal may change the definition of the RSRP in accordance with the subcarrier spacing. In addition, the terminal may correct the RSRP or the associated threshold in accordance with the subcarrier spacing. That is, in the radio communication system, it is possible to perform measurement adaptive to subcarrier spacing.

The control unit may calculate the RSRP based on the result of receiving the reference signal, and perform a determination related to the calculated RSRP, based on the subcarrier spacing. With this configuration, the terminal 20 can correct the RSRP or the associated threshold in accordance with the subcarrier spacing.

The control unit may obtain a reported value related to the RSRP to be transmitted to a base station, by adding an offset, which is different for each subcarrier spacing, to the calculated RSRP. With this configuration, the terminal 20 can correct the RSRP or the associated threshold in accordance with the subcarrier spacing.

The control unit may calculate the RSRP based on the result of receiving the reference signal, and the subcarrier spacing to be applied to the reference signal. With this configuration, the terminal 20 can change the definition of the RSRP in accordance with the subcarrier spacing.

The control unit may calculate the RSRP by multiplying a coefficient which is inversely proportional to the subcarrier spacing to be applied to the reference signal. With this configuration, the terminal 20 can change the definition of the RSRP in accordance with the subcarrier spacing.

In addition, according to the embodiment of the invention, there is provided a measurement method including, by a terminal, a receiving procedure of receiving a reference signal for acquiring a channel state, and a control procedure of performing measurement related to RSRP (Reference signal received power), based on a result of receiving the reference signal, and subcarrier spacing to be applied to the reference signal.

With the above configuration, the terminal 20 can measure the RSRP considering subcarrier spacing. In addition, the terminal may change the definition of the RSRP in accordance with the subcarrier spacing. In addition, the terminal may correct the RSRP or the associated threshold in accordance with the subcarrier spacing. That is, in the radio communication system, it is possible to perform measurement adaptive to subcarrier spacing.

(Supplement of Embodiment)

Hitherto, the embodiment of the invention is described, but the disclosed invention is not limited to such an embodiment, and those skilled in the art will understand various variations, modifications, alternatives, and substitutions. Although the description is made using specific numerical values for facilitating the understanding of the invention, unless otherwise specified, those numerical values are merely examples and any appropriate values may be used. The division of items in the above description is not essential to the present invention, contents described in two or more items may be used in combination as necessary, and contents described in one item may be applied to the contents described in another item (so long as there is no contradiction). The boundaries of the functional units or the processing units in the functional block diagram do not normally correspond to the boundaries of physical components. The operations of a plurality of functional units may be physically performed by one component, or the operation of one functional unit may be physically performed by the plurality of components. Regarding the processing procedure described in the embodiment, the order of the processing may be changed so long as there is no contradiction. Although the base station 10 and the terminal 20 have been described using the functional block diagrams for convenience of description of the processing, such a device may be implemented in hardware, software, or a combination thereof. Each piece of the software that operates by the processor in the base station 10 according to the embodiment of the invention and the software that operates by the processor in the terminal 20 according to the embodiment of the invention may be stored in a random access memory (RAM), a flash memory, a read only memory (ROM), an EPROM, an EEPROM, a register, a hard disk drive (HDD), a removable disk, a CD-ROM, a database, a server, and any other appropriate storage media.

In addition, the indication of information is not limited to the aspect/embodiment described in the present disclosure, and may be performed using another method. For example, the indication of information may be performed by physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block) and SIB (System Information Block))), other signals, or a combination thereof. In addition, the RRC signaling may be referred to as an RRC message, and may be, for example, an RRC Connection Setup message, an RRC Connection Reconfiguration message, and the like.

The aspect/embodiment described in the present disclosure may be applied to at least one of systems using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and the next generation system expanded based on the above systems. The embodiment may be applied to a combination (for example, combination of 5G and at least one of LTE and LTE-A, and the like) of a plurality of systems.

The order in the processing procedure, the sequence, the flowchart, and the like in the aspect/embodiment described in the present specification may be changed so long as there is no contradiction. For example, regarding the method described in the present disclosure, various step elements are presented using an order example, and the method is not limited to the presented specific order.

The specific operation set to be performed by the base station 10 in the present specification may be performed by an upper node in some cases. In a network configured by one or a plurality of network nodes including the base station 10, it is clear that various operations performed for a communication with the terminal 20 may be performed by at least one of the base station 10 and network nodes (for example, MME, S-GW, and the like are considered, but the network node is not limited thereto) other than the base station 10. A case where one network node other than the base station 10 is provided is described above as an example. However, a combination (for example, MME and S-GW) of a plurality of other network nodes may be provided as the other network node.

The information, the signal, and the like described in the present disclosure may be output from a higher layer (or lower layer) to the lower layer (or higher layer). The information, the signal, and the like may be input or output through a plurality of network nodes.

Information and the like to be input and output may be stored in a specific place (for example, memory) and may be managed using a management table. The information and the like to be input and output may be overwritten, updated, or added. The output information and the like may be deleted. The input information and the like may be transmitted to another device.

Determination in the present disclosure may be performed by a value (0 or 1) expressed by one bit, may be performed by a Boolean value (true or false), or may be performed by comparison of a numerical value (for example, comparison to a predetermined value).

Regardless of whether the software is referred to as software, firmware, middleware, the microcode, the hardware description language, or any other name, the software is required to be broadly construed to mean an instruction, an instruction set, a code, a code segment, a program code, a program, a subprogram, a software module, an application, a software application, a software package, a routine, a subroutine, an object, an executable file, an execution thread, a procedure, a function, and the like.

In addition, the software, the instruction, the information, and the like may also be transmitted and received through a transmission medium. For example, when the software is transmitted from a web site, a server, or other remote sources by using at least one of a wired technology (coaxial cable, optical fiber cable, twisted pair, digital subscriber line (DSL), and the like) and a wireless technology (infrared rays, microwaves, and the like), at least one of the wired technology and the wireless technology is included in the definition of the transmission medium.

The information, the signal, and the like described in the present disclosure may be represented using any of various different technologies. For example, data, an instruction, a command, information, a signal, a bit, a symbol, a chip, and the like may be represented by a voltage, a current, an electromagnetic wave, a magnetic field or magnetic particle, an optical field or photon, or any combination thereof.

Note that the terms described in the present disclosure and the terms necessary for understanding the present disclosure may be replaced with terms having the same or similar meanings. For example, at least one of the channel and the symbol may be a signal (signaling). In addition, the signal may also be a message. In addition, a component carrier (CC) may be referred to as a carrier frequency, a cell, a frequency carrier, or the like.

The terms "system" and "network" used in the present disclosure are used interchangeably.

Further, the information, the parameters, and the like described in the present disclosure may be represented by using an absolute value, may be represented by using a relative value from a predetermined value, or by using other corresponding information. For example, a radio resource may be instructed by an index.

The names used for the above parameters are not limited in any point. Further, expressions and the like using the parameters may differ from the expressions that are explicitly disclosed in the present disclosure. Because various channels (for example, PUCCH, PDCCH, and the like) and information elements can be identified by any suitable names, various names allocated to the various channels and information elements are not limited in any point.

In the present disclosure, the terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", and "component carrier" may be used interchangeably. The base station may be referred to as terms such as a macro cell, a small cell, a femto cell, and a pico cell.

The base station may accommodate one or a plurality (for example, three) of cells. When the base station accommodates the plurality of cells, the entirety of a coverage area of the base station may be divided into a plurality of smaller areas. A communication service may be provided in each of the smaller areas may provide by a base station subsystem (for example, small indoor base station (RRH: Remote Radio Head). The term "cell" or "sector" refers to a portion or the entirety of a coverage area of at least one of the base station and the base station subsystem that performs a communication service in this coverage.

In the present disclosure, the terms such as "mobile station (MS)", "user terminal", "user equipment (UE)", and "terminal" may be used interchangeably.

The mobile station may be referred, by those skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other appropriate term.

At least one of the base station and the mobile station may be referred to as a transmission device, a reception device, a terminal, or the like. Note that at least one of the base station and the mobile station may be a device mounted in a moving object or be a moving object itself. The moving object may be a vehicle (for example, car, airplane, and the like), a moving object (for example, drone, self-driving car, and the like) that moves in an unmanned manner, or a robot (manned or unmanned type). Note that at least one of the base station and the mobile station includes a device that needs not to move in a communication operation. For example, at least one of the base station and the mobile station may be an IoT (Internet of Things) device such as a sensor.

In addition, the base station in the present disclosure may be replaced with a user terminal. For example, the aspect/embodiment of the present disclosure may be applied to a configuration in which a communication between the base station and the user terminal is replaced with a communication (may be referred to as D2D (Device-to-Device) or V2X (Vehicle-to-Everything), for example) between a plurality of terminals 20. In this case, a configuration in which the function of the above-described base station 10 is provided in the terminal 20 may be made. In addition, the words such as "up" and "down" may be replaced with words (for example, "side") corresponding to a communication between terminals. For example, an uplink channel, a downlink channel, and the like may be replaced with a side channel.

Similarly, the user terminal in the present disclosure may be replaced with the base station. In this case, a configuration in which the function of the above-described user terminal is provided in the base station 10 may be made.

The term "determining" used in the present disclosure may encompass a wide variety of operations. "Determining" may include, for example, a case where judging, calculating, computing, processing, deriving, investigating, looking up, search, inquiry (for example, searching in a table, a database, or another data structure) are considered as "determining". In addition, "determining" may include, for example, a case where receiving (for example, receiving information), transmitting (for example, transmitting information), input, output, accessing (for example, accessing data in a memory) are considered as "determining", and the like. In addition, "determining" may include a case where resolving, selecting, choosing, establishing, comparing, and the like are considered as "determining". That is, "determining" may include the case of considering a certain operation as "determining". In addition, "determining" may be replaced with "assuming", "expecting", "considering", and the like.

The terms "connected" and "coupled", or any variation thereof mean any direct or indirect connection or coupling between two or more elements, and may include a case where one or more intermediate elements are provided between the two elements "connected" or "coupled" to each other. The connection or coupling between elements may be physically performed, be logically performed, or be performed in a combination thereof. For example, the "connection" may be replaced with an "access". When the term is used in the present disclosure, it may be considered that two elements are "connected" or "coupled" to each other by using at least one of one or more electrical wires, cables and printed electrical connections, and by using electromagnetic energy having wavelengths in a radio frequency range, a microwave range, and an optical (both visible and invisible) range, as some non-limiting and non-inclusive examples.

The reference signal may be abbreviated as RS and may be referred to as a pilot in accordance with the applied standard.

The phrase "based on" used in the present disclosure does not mean "based on only" so long as particular statement is not made. In other words, the phrase "based on" means both "based on only" and "based on at least".

Any reference to elements using the designations of "first", "second", and the like used in the present disclosure does not generally limit the amount or order of the elements. The designations may be used in present disclosure as a convenient manner to distinguish between two or more elements. Thus, references to the first and second elements do not mean that only two elements may be employed, or that the first element must precede the second element in any form.

"Means" in the configuration of the above devices may be replaced with "unit", "circuit", "device", and the like.

In the present disclosure, when the terms "include", "including", and variations thereof are used, the terms are intended to be inclusive, as with the term "comprising". Further, the term "or" used in the present disclosure is intended not to be exclusive-OR.

A radio frame may be configured by one or a plurality of frames in time domain. One or each of a plurality of frames in the time domain may be referred to as a subframe. The subframe may be further configured by one or a plurality of slots in the time domain. The subframe may have a fixed time length (for example, 1 ms) that does not depend on numerology.

The numerology may be a communication parameter to be applied to at least one of transmission and reception of a certain signal or channel. The numerology may indicate at least one of, for example, subcarrier spacing (SCS), a bandwidth, a symbol length, a cyclic prefix length, a transmission time interval (TTI) length, the number of symbols per TTI, a radio frame configuration, specific filtering processing performed by a transmission and reception device in the frequency domain, specific windowing processing performed by the transmission and reception device in the time domain, and the like.

The slot may be configured by one or a plurality of symbols (OFDM (Orthogonal Frequency Division Multiplexing) symbol, SC-FDMA (Single Carrier Frequency Division Multiple Access) symbol, and the like) in the time domain. The slot may be a time unit based on the numerology.

The slot may include a plurality of mini slots. Each mini slot may be configured by one or a plurality of symbols in the time domain. In addition, the mini slot may also be referred to as a subslot. The mini slot may be configured by a smaller number of symbols than the number of slots. A PDSCH (or PUSCH) to be transmitted in a time unit larger than the mini slot may be referred to as a PDSCH (or PUSCH) mapping type A. A PDSCH (or PUSCH) to be transmitted using a mini slot may be referred to as a PDSCH (or PUSCH) mapping type B.

All of the radio frame, the subframe, the slot, the mini slot, and the symbol indicate a time unit when a signal is transmitted. Other names corresponding to the radio frame, the subframe, the slot, the mini slot, and the symbol may be used.

For example, one subframe may be referred to as a transmission time interval (TTI). A plurality of continuous subframes may be referred to as the TTI. One slot or one mini slot may be referred to as the TTI. That is, at least one of the subframe and the TTI may be a subframe (1 ms) in the known LTE, be a period (for example, 1 to 1.3 symbols) shorter than 1 ms, or be a period longer than 1 ms. Note that the unit representing the TTI may be referred to as not the subframe, but a slot, a mini slot, or the like.

Here, the TTI refers to a minimum time unit for scheduling in a radio communication, for example. For example, in an LTE system, the base station performs scheduling in which radio resources (frequency bandwidth, transmission power, and the like used in each terminal 20) are allocated in a TTI unit, for each terminal 20. Note that the definition of the TTI is not limited to the above description.

The TTI may be a transmission time unit of a channel-coded data packet (transport block), a code block, a codeword, or the like, or may be a processing unit of scheduling, link adaptation, or the like. Note that, when the TTI is given, a time interval (for example, the number of symbols) in which a transport block, a code block, a codeword, or the like is mapped in practice may be shorter than the TTI.

Note that, when one slot or one mini slot is referred to as the TTI, one or more TTIs (that is, one or more slots, or one or more mini slots) may be the minimum time unit for scheduling. In addition, the number of slots (the number of mini slots) forming the minimum time unit for the scheduling may be controlled.

The TTI having a time length of 1 ms may be referred to as a general TTI (TTI in LTE Rel.8-12), a normal TTI, a long TTI, a general subframe, a normal subframe, a long subframe, a slot, and the like. A TTI shorter than the general TTI may be referred to as a reduced TTI, a short TTI, a partial TTI (or fractional TTI), a reduced subframe, a short subframe, a mini slot, a subslot, a slot, and the like.

Note that the long TTI (for example, general TTI, subframe, and the like) may be replaced with a TTI having a time length which is longer than 1 ms. The short TTI (for example, reduced TTI and the like) may be replaced with a TTI having a TTI which is shorter than the TTI length of a long TTI and is equal to or longer than 1 ms.

A resource block (RB) is a resource allocation unit in the time domain and the frequency domain. The resource block may include one or a plurality of continuous subcarriers in the frequency domain. The number of subcarriers included in an RB may be equal regardless of the numerology and may be 12, for example. The number of subcarriers included in an RB may be determined based on the numerology.

In addition, an RB in the time domain may include one or a plurality of symbols, and the RB may have a length of one slot, one mini slot, one subframe, or one TTI. One TTI, one subframe, or the like may be configured by one or a plurality of resource blocks.

Note that one or a plurality of RBs may be referred to as a physical resource block (PRB), a subcarrier group (SCG), a resource element group (REG), a PRB pair, an RB pair, or the like.

In addition, the resource block may also be configured by one or a plurality of resource elements (RE). For example, one RE may be a radio resource area of one subcarrier and one symbol.

A bandwidth part (BWP) (may be referred to as a partial bandwidth or the like) may represent a subset of continuous common RBs (resource blocks) for a certain numerology in a certain carrier. Here, the common RB may be specified by the index of the RB based on the common reference point of the carrier. The PRB may be defined in a BWP and is numbered within that BWP.

The BWP may include a BWP (UL BWP) for an UL and a BWP (DL BWP) for a DL. One or a plurality of BWPs may be configured in one carrier for a UE.

At least one of configured BWPs may be active. The UE may not assume transmission and reception of a predetermined signal/channel in parts other than the active BWP. Note that the "cell", the "carrier", and the like in the present disclosure may be replaced with the "BWP".

The above-described structures of the radio frame, the subframe, the slot, the mini slot, the symbol, and the like are just an example. For example, the configuration such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, and a cyclic prefix (CP) length may be variously changed.

In the present disclosure, for example, when translations add articles such as a, an, and the in English, the present disclosure may include the nouns that follow the articles in the plural.

In the present disclosure, the phrase "A and B are different" may mean that "A and B are different from each other". Note that the phrase may mean that "A and B are different from C". The terms "separate", "coupled", and the like may be construed as the similar meaning to "being different".

The aspect/embodiment described in the present disclosure may be singly used, be used in combination thereof, or be used by being switched with performing. In addition, an indication of predetermined information (for example, indication of "being X") is not limited to being explicitly performed and may be implicitly performed (for example, the indication of the predetermined information is not performed).

Note that, in the present disclosure, the CSI-RS is an example of the reference signal for acquiring the channel state.

Although the present disclosure has been described in detail above, it will be apparent to those skilled in the art that the invention is not limited to the embodiment described in the present specification. The present disclosure can be implemented as modifications and changes without departing from the spirit and scope of the present disclosure defined by the description of the claims. Therefore, the description of the present disclosure is for the purpose of exemplifying explanation, and does not have any restrictive meaning to the present disclosure.

EXPLANATIONS OF LETTERS OR NUMERALS

10 BASE STATION
110 TRANSMITTING UNIT
120 RECEIVING UNIT
130 CONFIGURING UNIT
140 CONTROL UNIT
20 TERMINAL
210 TRANSMITTING UNIT
220 RECEIVING UNIT
230 CONFIGURING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a receiver that receives a reference signal for acquiring a channel state; and
a processor that performs a measurement related to RSRP (Reference signal received power), based on a result of receiving the reference signal, and subcarrier spacing applied to the reference signal,
wherein the processor calculates the RSRP based on the result of receiving the reference signal, and the subcarrier spacing applied to the reference signal,
wherein the processor determines a handover by using a corrected threshold, the corrected threshold being obtained by multiplying a reference threshold by a coefficient, the coefficient being inversely proportional to the subcarrier spacing applied to the reference signal,
wherein the processor determines a value, to be reported to a base station, by adding an offset to the measured RSRP based on the subcarrier spacing applied to the reference signal, and
wherein the offset is different for different subcarrier spacings.

2. A measurement method executed by a terminal, the method comprising:
receiving a reference signal for acquiring a channel state; and
performing a measurement related to RSRP (Reference signal received power), based on a result of receiving the reference signal, and subcarrier spacing applied to the reference signal,
wherein the performing calculates the RSRP based on the result of receiving the reference signal, and the subcarrier spacing applied to the reference signal, and
wherein the performing determines a handover by using a corrected threshold, the corrected threshold being obtained by multiplying a reference threshold by a coefficient, the coefficient being inversely proportional to the subcarrier spacing applied to the reference signal; and
determining a value, to be reported to a base station, by adding an offset to the measured RSRP based on the subcarrier spacing applied to the reference signal,
wherein the offset is different for different subcarrier spacings.

* * * * *